Figure 17:
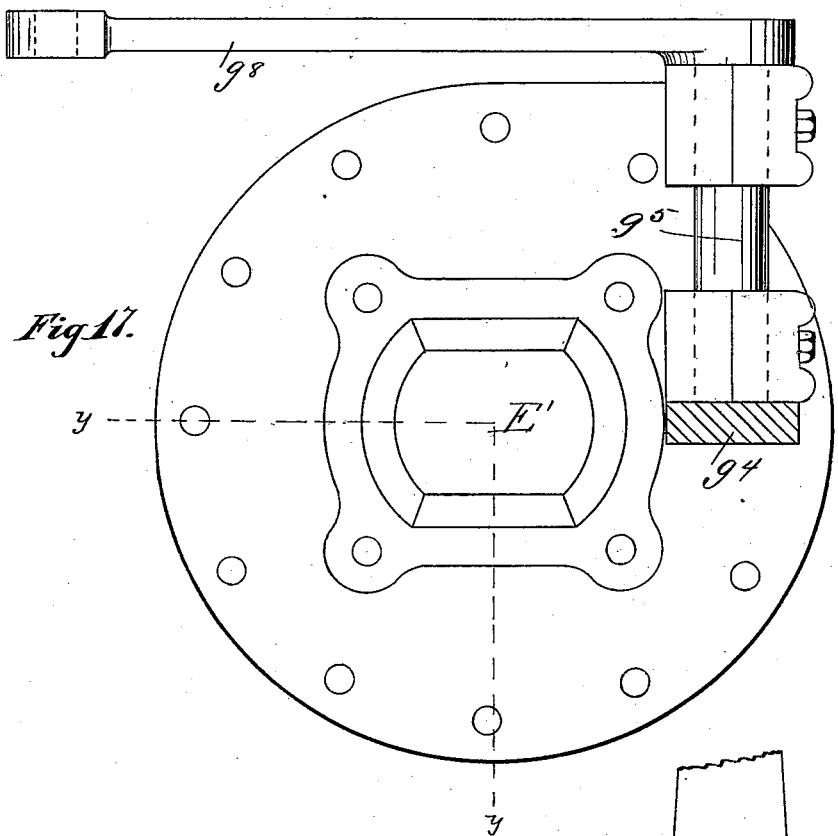

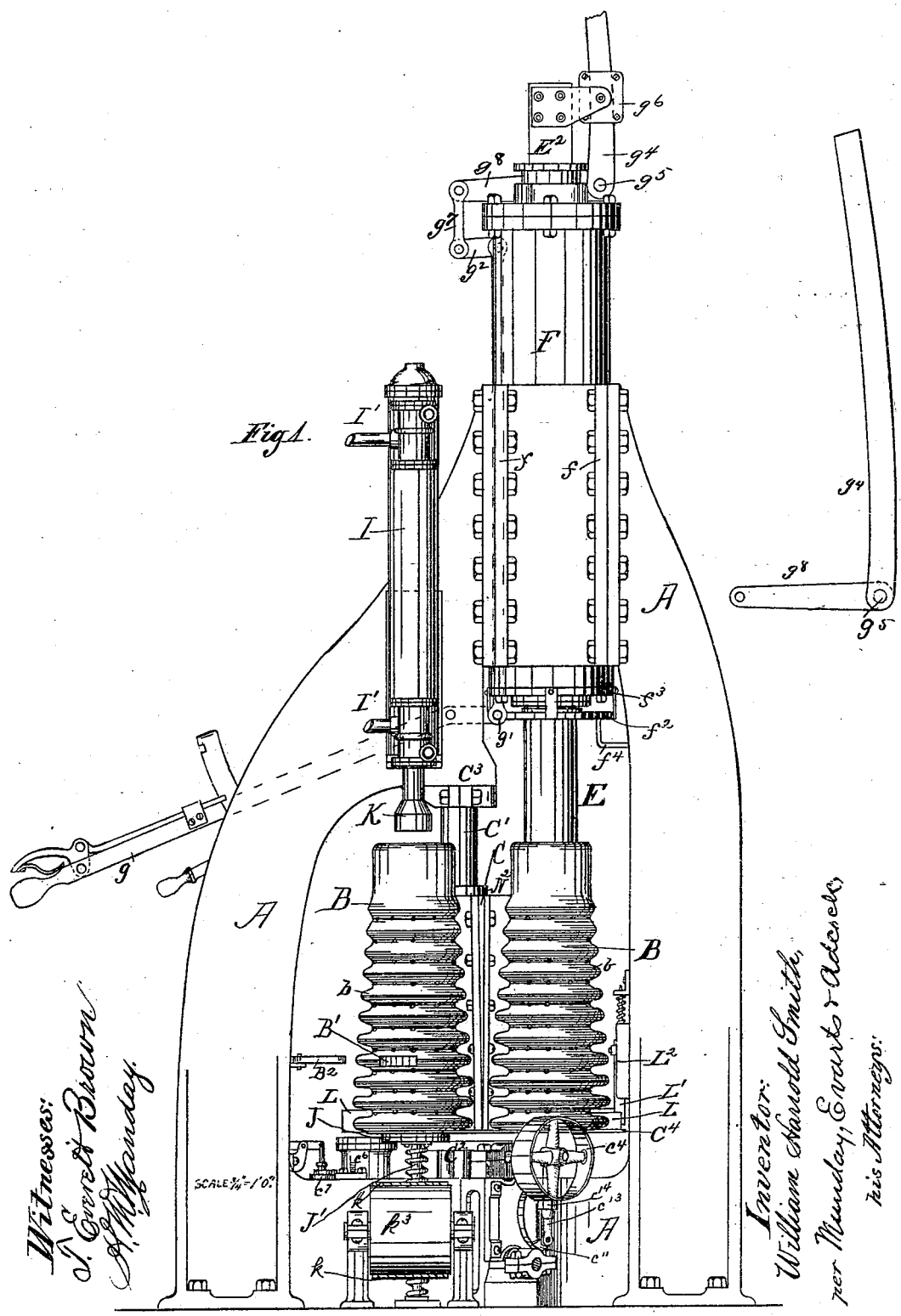

(No Model.) 9 Sheets—Sheet 2.
W. H. SMITH.
MACHINE FOR CONSOLIDATING LOOSE AND BULKY MATERIALS INTO SOLID BLOCKS.
No. 275,866. Patented Apr. 17, 1883.
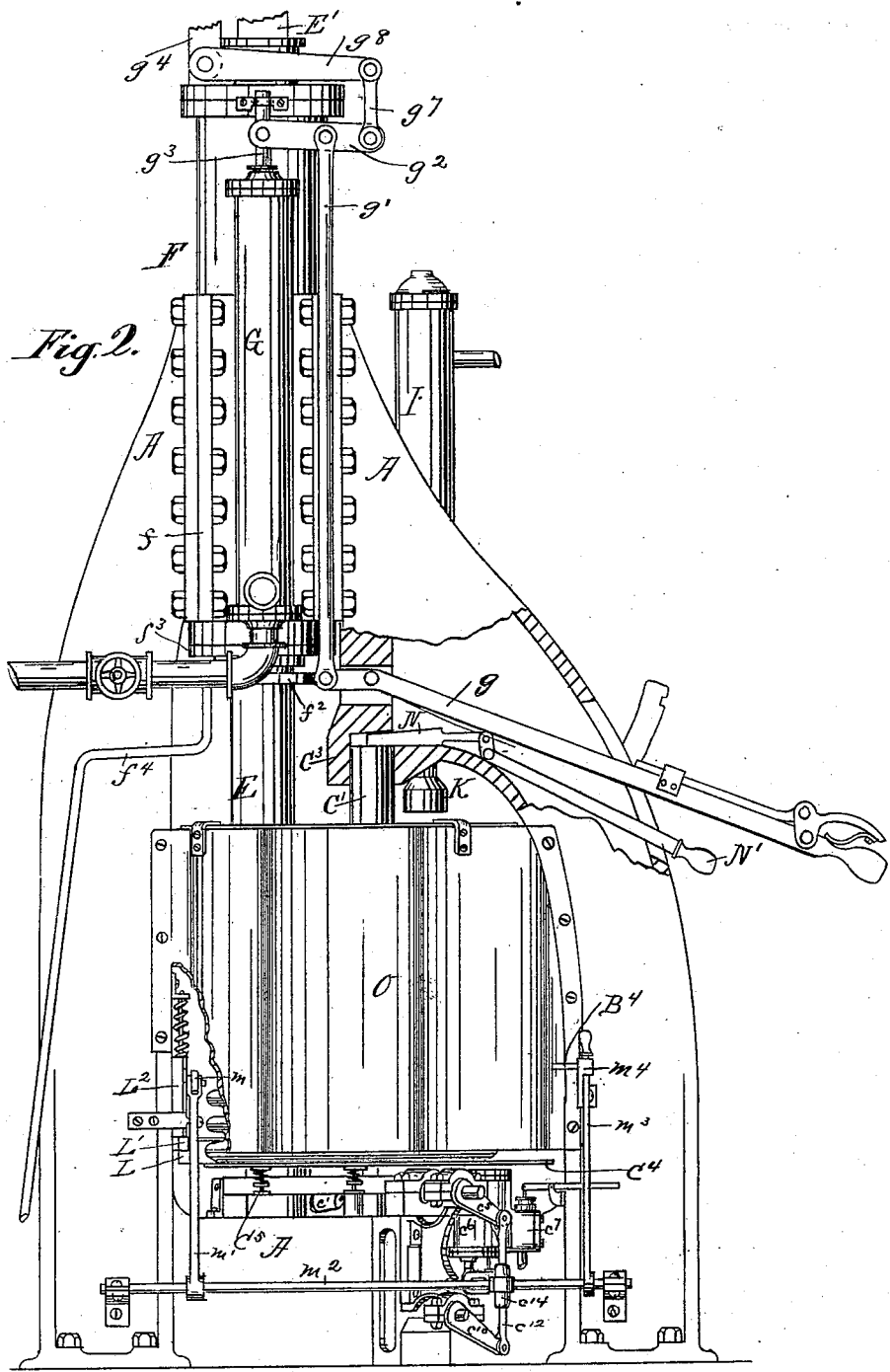

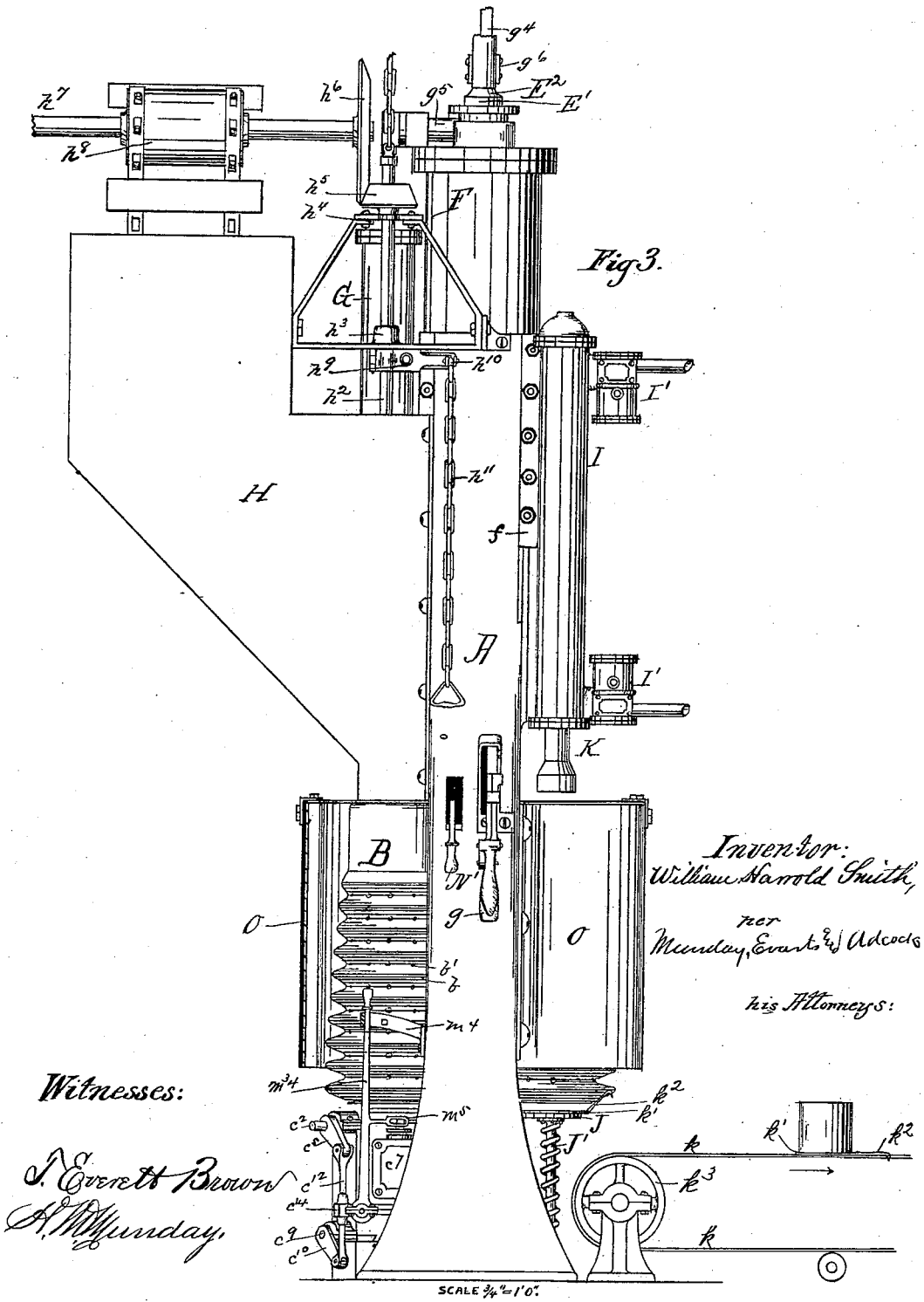

(No Model.) 9 Sheets—Sheet 4.
W. H. SMITH.
MACHINE FOR CONSOLIDATING LOOSE AND BULKY MATERIALS INTO SOLID BLOCKS.
No. 275,866. Patented Apr. 17, 1883.
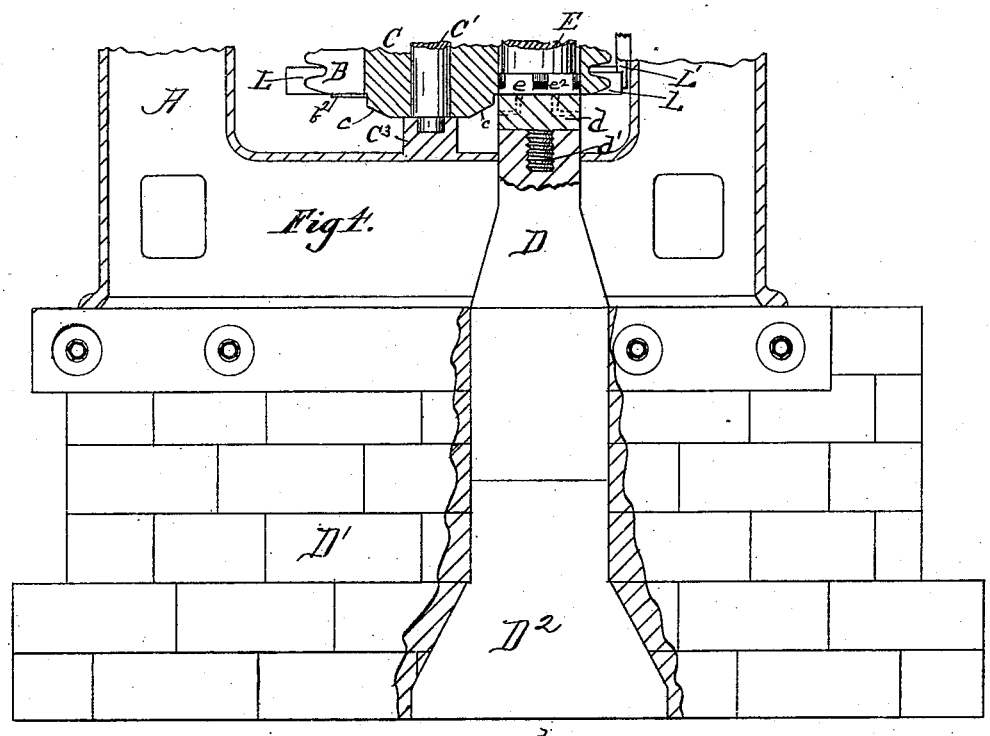
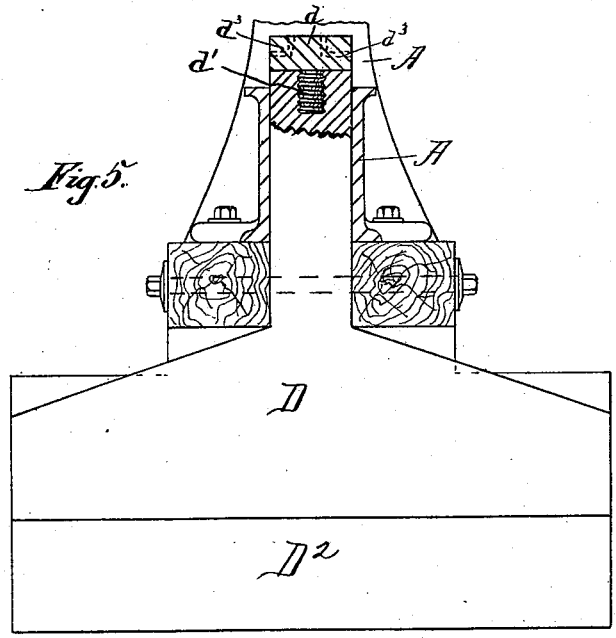
SCALE ¾"=1'0".
Witnesses:
S. Everett Brown
H. W. Munday
Inventor:
William Harrold Smith,
per Munday, Evarts & Adcock
his Attorneys

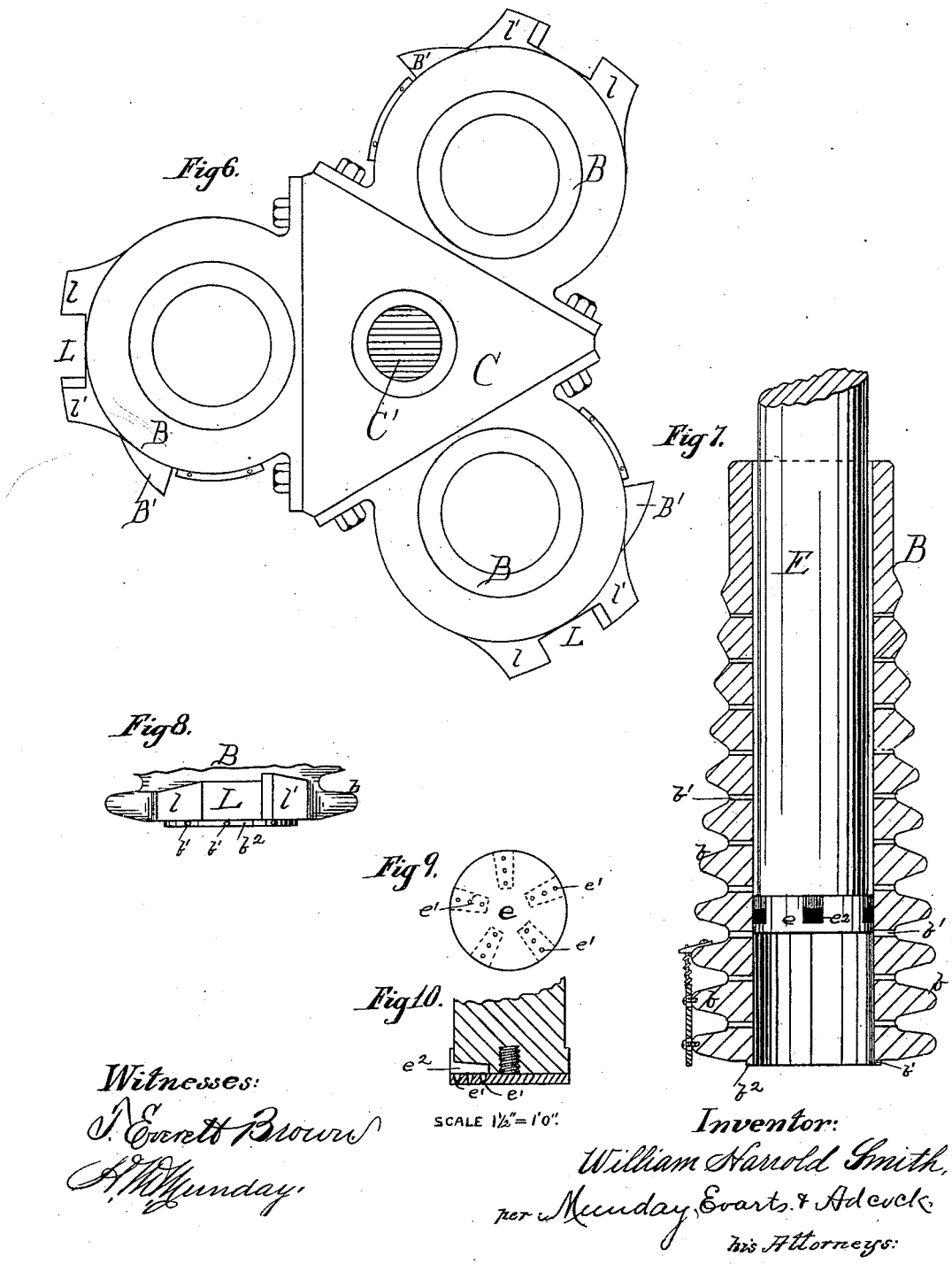

(No Model.) 9 Sheets—Sheet 6.
W. H. SMITH.
MACHINE FOR CONSOLIDATING LOOSE AND BULKY MATERIALS INTO SOLID BLOCKS.
No. 275,866. Patented Apr. 17, 1883.
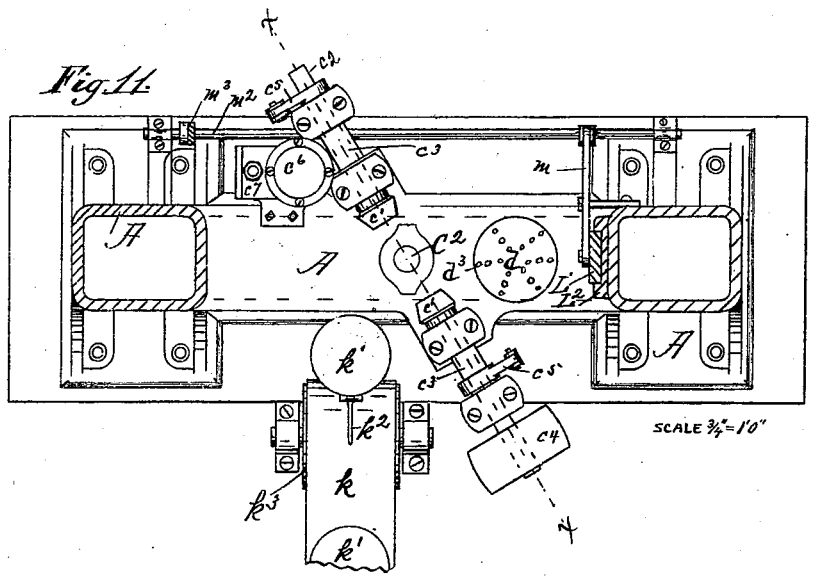
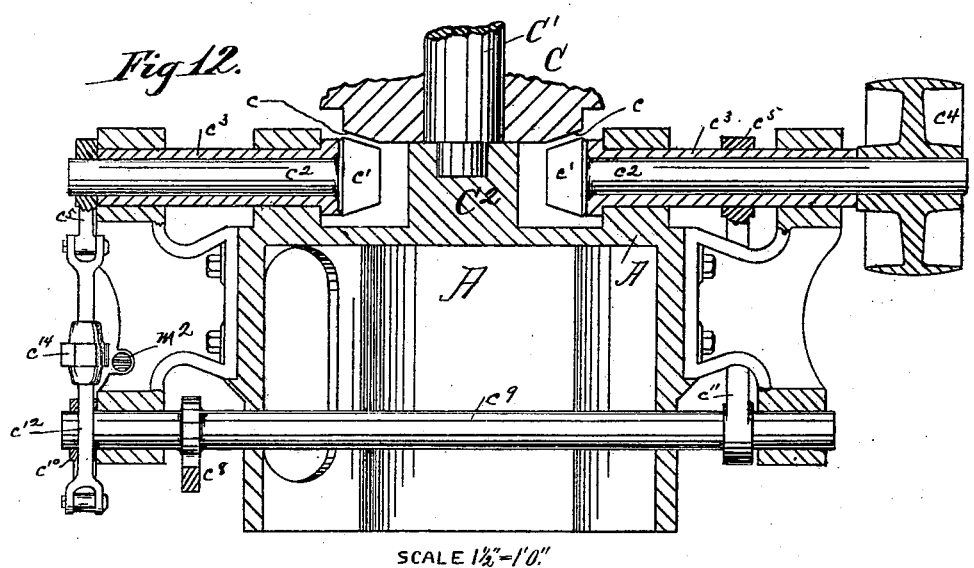
Witnesses:
T. Everett Brown
A. W. Munday
Inventor:
William Harrold Smith,
per Munday, Evarts & Adcock
his Attorneys (No Model.) 9 Sheets—Sheet 7.
W. H. SMITH.
MACHINE FOR CONSOLIDATING LOOSE AND BULKY MATERIALS INTO SOLID BLOCKS.
No. 275,866. Patented Apr. 17, 1883.
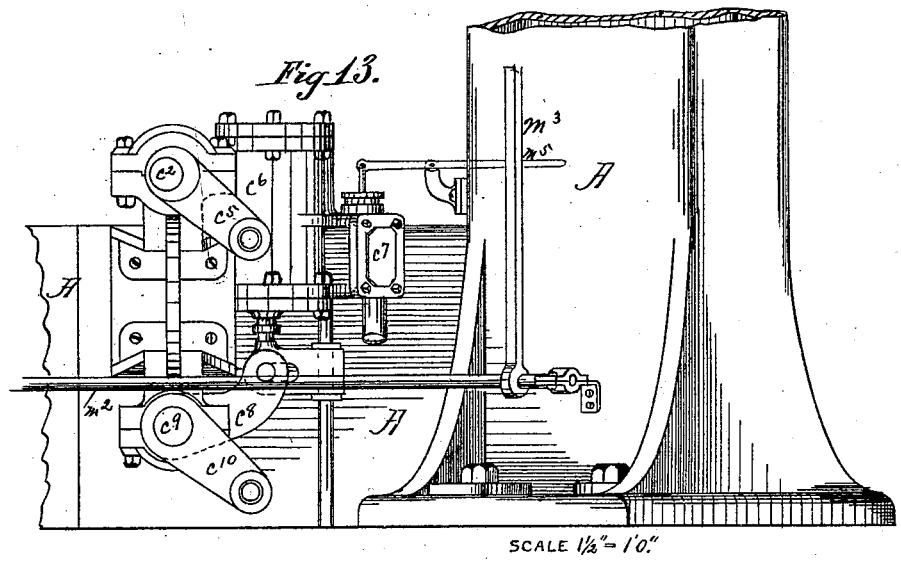
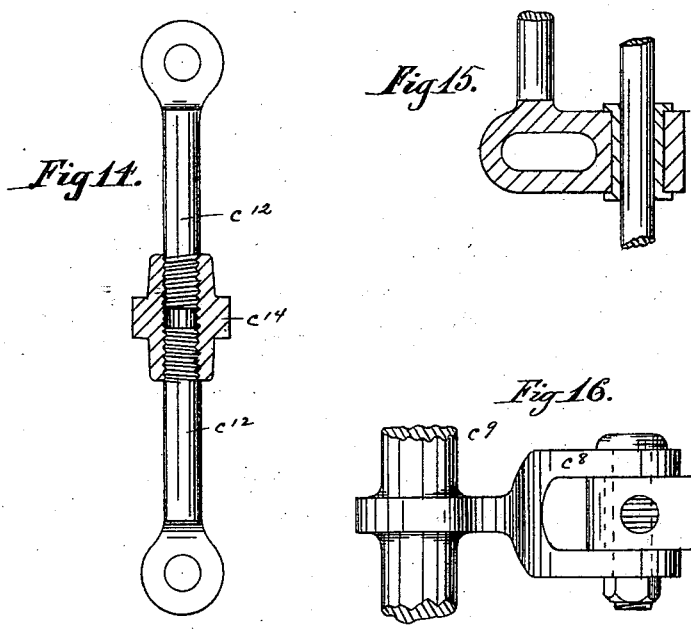
Witnesses: Inventor:

(No Model.) 9 Sheets—Sheet 8.

W. H. SMITH.

MACHINE FOR CONSOLIDATING LOOSE AND BULKY MATERIALS INTO SOLID BLOCKS.

No. 275,866. Patented Apr. 17, 1883.

SCALE 3"–1'0".

Witnesses:
S. Everett Brown
H. W. Munday

Inventor:
William Harrold Smith,
per Munday, Evarts & Adcock,
his Attorneys:

(No Model.) 9 Sheets—Sheet 9.
W. H. SMITH.
MACHINE FOR CONSOLIDATING LOOSE AND BULKY MATERIALS INTO SOLID BLOCKS.
No. 275,866. Patented Apr. 17, 1883.
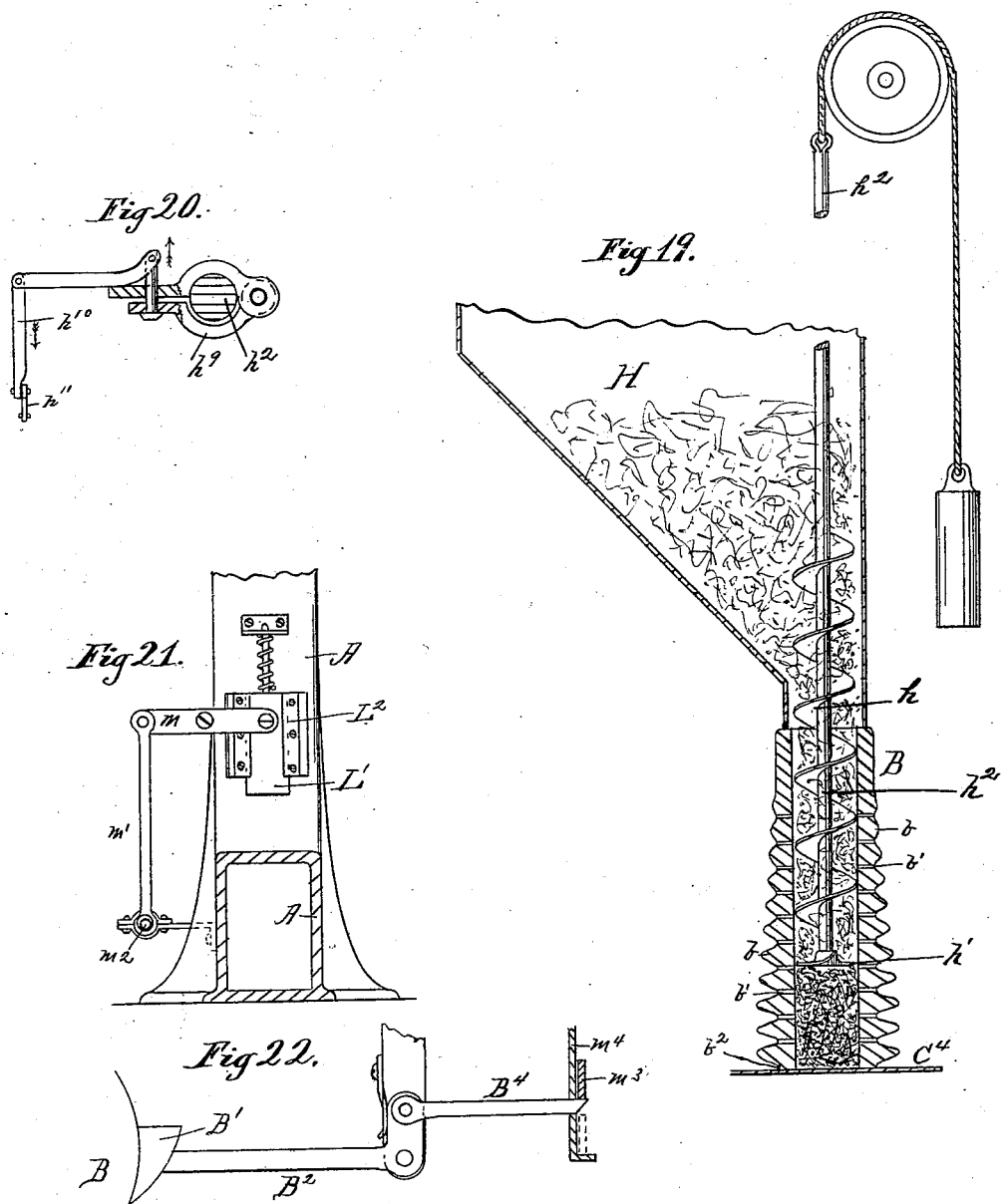

UNITED STATES PATENT OFFICE.

WILLIAM HARROLD SMITH, OF CHICAGO, ILLINOIS, ASSIGNOR TO THE SMITH CONSOLIDATION COMPANY, OF SAME PLACE.

MACHINE FOR CONSOLIDATING LOOSE AND BULKY MATERIAL INTO SOLID BLOCKS.

SPECIFICATION forming part of Letters Patent No. 275,866, dated April 17, 1883.

Application filed September 11, 1882. (No model.)

*To all whom it may concern:*

Be it known that I, WILLIAM HARROLD SMITH, of Chicago, Cook county, State of Illinois, have invented a certain new and useful Machine for Consolidating Loose and Bulky Material into Solid Blocks, of which the following is a specification.

The object of my invention is to provide a machine for reducing loose bulky materials having more or less resiliency—such as bran or sawdust, for example—to solid self-coherent blocks by successive blows of a heavy hammer. This result, after various experiments, I have succeeded in accomplishing by the following means, and therein my invention consists, viz: in a mold for the material, an anvil upon which the same is mounted, and a hammer fitting the mold, whose blow is followed up by force, so as to prevent rebound, the mold, hammer, or anvil (one or all) being provided with holes or ducts for the escape of the air from the material as it is being compressed, and the mold or anvil (one or both) being movable or reversible, so that the solid block, when formed, may be discharged therefrom. In this way, no separate die being interposed between the material in the mold and the hammer to take blow thereof, and the blow of the descending hammer being followed up by the striking or actuating force, so as to prevent rebound, and provision being made for the escape of the air, which would otherwise prevent cohesion of the particles, I am enabled to reduce so resilient a material as cotton into solid self-coherent blocks suitable for shipment without any bales, ties, or bagging.

My invention also consists, in connection with the hammer, anvil, and mold, of a device for delivering the material to be compressed to the mold, and a device for delivering the solid blocks from the machine as they are discharged from the mold.

It also consists in mechanism for moving the mold or anvil, or a portion of one or the other, into position for discharging the block, and in mechanism for punching out or discharging the block from the mold, whether such discharging mechanism consists of the hammer or a separate piston for punching out the block. If the mold be made movable, I deem it preferable to employ three molds, so that the operations of compressing, filling the material into the mold, and discharging the block therefrom may be all performed simultaneously. In this case of course I employ a separate piston for discharging the blocks from the molds. If the anvil or a portion thereof or the bottom portion of the mold be made movable, but a single mold need be used.

My invention also consists in the various devices and combinations of devices herein shown or described, whereby the operations of my machine or of its various parts are carried out or effected.

In the accompanying drawings, which form part of this specification, I have shown what I deem the most preferable method of practicing my invention.

Figure 18:
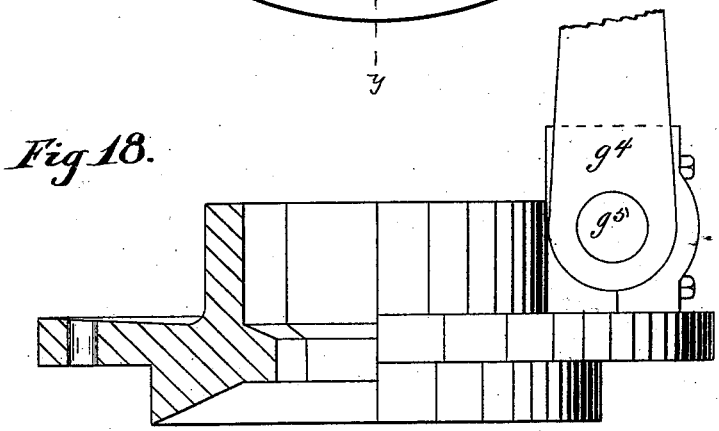

In the drawings, Figures 1 and 2 are side elevations of a machine embodying my invention, looking from opposite sides. Fig. 3 is an end elevation. Figs. 4 and 5 are side and end elevations, partially in section, of the anvil. Fig. 6 is a top view of the molds. Fig. 7 is a section of one of the molds. Fig. 8 is a side elevation of the lower end of one of the molds, showing the clutch. Fig. 9 is a bottom view of the hammer, and Fig. 10 a central section of the hammer. Fig. 11 is a top or plan view, with the molds removed. Fig. 12 is a vertical section on line $x\ x$ of Fig. 11. Fig. 13 is a view partly in perspective of the same part of the machine. Figs. 14, 15, and 16 are details of parts hereinafter more fully described. Fig. 17 is a top view of the steam-cylinder. Fig. 18 is a section on line $y\ y$ of Fig. 17. Fig. 19 is a sectional elevation of the feeding device; and Figs. 20, 21, and 22 are detail views of parts hereinafter described.

Similar letters of reference indicate like parts wherever used.

In the drawings, A represents the main frame of the machine, preferably made of cast-iron. The molds B—three in number—are securely bolted to a central triangular block, C, provided with a central pivotal shaft, C', having bearings $C^2\ C^3$ in the main frame A of the machine at bottom and top, and adapted to permit of its being slightly raised or lowered to cause the molds to clear the anvil when being revolved. The base of the central block, C, is provided with a circular track, c, preferably made somewhat inclined or conical; and the mechanism for raising and revolving the molds consists of one or more (preferably two) friction wheels or rollers, $c'$, whose shafts $c^2$ are mounted in eccentric sleeves $c^3$, one of the shafts $c^2$ being provided with a pulley, $c^4$, by which the same is driven, and the eccentric sleeves $c^3$ with cranks $c^5$, by which the same are turned so as to raise the friction-rollers $c'$ against the tracks, and thereby lift the molds clear of the anvil and cause the same to revolve around the shaft $C'$. The cranks $c^5$ are operated to turn the sleeves $c^3$ by a small steam cylinder and piston, $c^6$ $c^7$, crank-arm $c^8$, shaft $c^9$, crank-arms $c^{10}$ and $c^{11}$, and connecting-bars $c^{12}$ and $c^{13}$. The length of the bars $c^{12}$ and $c^{13}$ are made adjustable by means of a turn-buckle, $c^{14}$, so as to regulate the throw or turn of the eccentric sleeves $c^3$. $C^4$ is a plate or table, secured to the frame of the machine at the bottom of the molds, and provided with two openings—one through which the face of the anvil projects, and the other under the knocking-out piston to allow the block to be discharged. It is pressed firmly against the bottom of the molds by springs $C^5$, so as to prevent the escape of material when the molds are raised and revolved.

The anvil D is made very heavy and strong, and projects through the frame A of the machine and the thin plate $C^4$, and is embedded in a foundation of masonry, $D'$ $D^2$ $D^2$, and beams of wood resting upon and bolted to the anvil, and to which the main frame A is also secured by bolts or otherwise. The face $d$ of the anvil should be made of steel, and is secured firmly to the cast-iron body part of the anvil by a screw, $d'$. The anvil is so located in reference to the molds that as they are revolved they will come in turn directly over its center. The face of the anvil $d$ is provided with holes or air-passages $d^3$ for the escape of air from the molds.

The molds B are cast preferably with gradually-increasing circular projections or corrugations $b$ from top to base, so as to afford the greatest strength at the bottom. By making the mold of this corrugated exterior form greater strength will be afforded with the same weight of metal than if its exterior were simply made conical or tapering, the rings or corrugations $b$ serving in a measure as bands. The mold is provided with a number of holes or ducts, $b'$, to permit the escape of air from the material as it is being compressed, and also to admit the air to the mold below the hammer when it is being withdrawn and prevent the formation of a vacuum or partial vacuum above the material as the hammer is raised. The molds B are also provided with a short narrow shoulder or ring, $b^2$, at their base, so that the mold will have a narrow bearing-surface upon the anvil, the better to permit the escape of air at the base; and I deem it preferable to perforate said shoulder with holes $b'$ for the same purpose.

E is the hammer. Its end or face $e$ is made to fit the mold accurately, though not too closely, while the body of the hammer is slightly smaller than the mold, so as to allow the free passage of air between them, and the face $e$ is provided with small holes or ducts $e'$ and $e^2$, communicating with the space between the body of the hammer and the mold, so that as the hammer descends the air in the mold may escape through such ducts or air-passages or be admitted through them when the hammer is withdrawn, or the face $e$ may also be made slightly smaller than the molds. By reason of these provisions for the escape of the air from the midst of the material being compressed it is prevented from air-cushioning the hammer and causing its sudden rebound; but for such provision made for the escape of the air out of the mold, the compressed and imprisoned air would prevent cohesion between the particles of the loose material and their formation into solid self-coherent blocks. These ducts through the face of the hammer and through the mold also serve to admit the air between the hammer and the material being compressed when the hammer is raised, and thus prevent the material being fluffed up or withdrawn with the hammer. The hammer E is integral with the piston $E'$ of the steam-cylinder F, by which the same is operated.

G is the steam-chest, which is provided with a valve at each end opening into the cylinder, so that when the hammer is descending the force of the steam behind the piston will follow up the blow of the hammer and prevent its rebounding.

$g$ $g'$ $g^2$ $g^3$ are the levers and connecting-rods, by which the valves of the steam-chest are operated to let in the steam above or below the piston or to cut it off entirely.

$g^4$ is an arm secured to a rock-shaft, $g^5$, and provided with a slide, $g^6$, secured to the end of the piston, and connected with lever $g^2$ by the link $g^7$ and arm $g^8$, so that as the piston is raised or lowered it will move said arm in or out and operate the valves of the steam-chest to cut off the steam from the cylinder and give a stroke just in proportion to the previous movement of the hand-lever $g$.

The cylinder F is cast with proper flanges, $f$, for bolting onto the frame A, so as to form a part thereof.

$f^2$ is a shallow cup or basin secured to the cylinder below the gland $f^3$, for catching any water that may flow or leak therefrom, and prevent its dropping into the mold. This pan or basin is provided with an elastic ring or band that surrounds the piston, and with an escape-pipe, $f^4$, for carrying off the water. The upper part of the piston $E'$ is provided with flat sides $E^2$ to prevent its turning and insure its retaining the same relative position to the arm $g^4$.

H is a hopper so located in relation to the hammer that when one of the molds is under the hammer another one will be beneath the hopper. It is provided with a screw-blade, $h$, and packer-disk $h'$ at its end, adapted to fit the mold, whereby the loose material may be fed into and partially packed or compressed in the mold. The packer-shaft $h^2$ is mounted in bearings $h^3$ $h^4$, and driven by bevel-gears $h^5$ $h^6$, the latter on counter-shaft $h^7$, which is driven by the sprocket-wheel $h^8$. The shaft $h^2$ is adapted to slide through the gear $h^5$ as the mold is filling. The extent to which the material is packed or compressed in the mold is regulated by a friction-clamp, $h^9$, on the shaft $h^2$, which is operated by levers $h^{10}$ and cord or chain $h^{11}$. When the friction-clamp is released by pulling the cord, the counterbalance-weight, $h^{12}$ connected with shaft $h^2$ by cord or chain $h^{13}$, passing over pulley $h^{14}$, will raise the packer-shaft out of the mold, the height to which the same is thereby lifted being regulated by a stop. The mechanism for stopping and starting the motion of the counter-shaft $h^7$, I have not shown in the drawings, but any ordinary device for that purpose may be used; or the gear $h^5$ may be provided with a clutch operated by the clamp-lever $h^{10}$.

I is a small steam-cylinder for operating the piston K, by which the solid blocks are knocked out or discharged from the mold. It is provided with a steam-chest, I', at each end, and valves through which steam is admitted above and below the piston, so that the pushing-out blow may be accurately regulated.

J is a disk or table mounted on a spring standard or piston, J', immediately below the discharging-piston K, for receiving and supporting the block as it is pushed out of the mold. Any yielding support—as a belt or apron, for example—may be used in place of the spring-table for receiving the blocks from the mold.

$k$ is an endless apron or chain carrier, for delivering the blocks from the machine.

$k'$ $k'$ are rings provided with hooks $k^2$ $k^2$, which catch in the links of the chain $k$. Before the block is pushed out an attendant places one of these rings or disks $k'$ on the spring-table J, so that the block when it is pushed out falls into it, and as the table J is pushed down the hook $k^2$ comes in contact with the chain running on the pulley-wheel $k^3$, and thus draws the block onto the carrier.

Each of the molds B is provided with a clutch or lock catch, L, in which drops a clutch or lock bolt, L', when the mold is moved under the hammer, so as to insure the accurate alignment of the mold and hammer and hold the latter in place while the material is operated upon. The clutch L is formed by a pair of projections, $l$ and $l'$, cast on the circumference of the mold, the upper face of the front one of which, $l$, is somewhat inclined, so that the spring-lock bolt L' may ride on the same and drop into the clutch the moment it passes over it, and the rear one of which, $l'$, is made somewhat higher than the front one, so that the clutch-bolt would strike its vertical face and prevent the mold revolving too far. The clutch-bolt L' is mounted in a vertical slide or way, $L^2$, secured to the frame A directly opposite the hammer from the center shaft of the machine, around which the molds revolve. The clutch-bolt is operated by lever $m$, connecting-bar $m'$, shaft $m^2$, and handle $m^3$. The clutch-bolt is also provided with a spring, $L^3$, by which it is forced into the clutch when the levers are unlocked. The handle or lever $m^3$ is also connected by the bracket $m^4$ with the lever $m^5$, for operating the valve of the small steam-cylinder, by which the molds are raised, so that the instant the lock-bolt L' is withdrawn from the clutch by the lever $m^3$ steam is admitted into the cylinder $c^6$ and the molds are raised and caused to revolve. The molds are also each provided with a cam, B', on their circumference, which operates a bent lever, $B^2$, and withdraws the spring-catch bolt $B^4$, by which the lever $m^3$, operating cut-off lever $m^5$, is tripped and the steam cut-off from the cylinder, causing the molds to cease revolving the moment one of the molds gets into position under the hammer.

N is a flat wedge, inserted above the central shaft, C', between it and the end of its bearing $C^2$, to prevent the molds from rising or crawling up during the operation of the hammer. This wedge may be operated by a bent lever, N'.

$N^2$ is a ring or collar welded to the shaft C' just above the triangular casting C, to prevent the same slipping up on the shaft.

O is a jacket or hood encircling all the molds for the purpose of excluding dust, and also for the purpose of affording a chamber into which steam or heated air may be admitted to warm the molds before the machine is started, as otherwise the great mass of cold iron in the molds would cause the gluten pressed out of the material to the outside of the block to congeal and make the block stick to the side of the mold, and thus cause inferior work when the machine is first started. This jacket may be either secured to the molds themselves and revolve with them, or to the stationary frame of the machine and the molds revolve within it.

There are certain particular parts or devices herein shown and described which I believe to possess novel features, but which are not of my invention, the same being, as I believe, the invention of John H. Wagner—viz., the corrugated form of the molds, the lever-arm $g^4$, and steam cut-off mechanism for operating the hammer, and the friction-pulleys having shafts mounted in eccentric sleeves, and connecting mechanism for lifting and revolving the molds; and to these particular devices I make no separate claim.

R is a curved plate or scraper adjustably secured to each mold for the purpose of cleaning or scraping or cleaning off any material which may fall upon the plate $C^4$ or stick to the anvil.

I claim—

1. In a machine for consolidating loose materials into solid blocks, the combination of an anvil with a mold mounted thereon and a hammer adapted to fit said mold, and provided with means whereby the actuating force is made to follow up the descending blow of the hammer, said hammer, anvil, and mold (one or more) being provided with air-passages, substantially as specified.

2. The combination of an anvil with a steam hammer, piston, and cylinder, a mold mounted on said anvil under said hammer, means for the escape of air from the material being consolidated in the mold, and for its admission to the mold above the material or partially-formed block as the hammer makes its upward stroke, and means whereby the force of the steam is made to follow up the hammer on its descending stroke, substantially as specified.

3. The combination, with a steam hammer, piston, and cylinder, of an anvil and a mold mounted thereon under said hammer, means for the escape and admission of air thereto, means for causing the force of the steam to follow up the descending blow of the hammer, mechanism for discharging the block from the mold, and a device for delivering the loose material to the mold, substantially as specified.

4. The combination, with a steam hammer, piston, and cylinder wherein the force of the steam follows up the descending blow of the hammer, of an anvil, and a mold mounted thereon under said hammer, and provided with means for the escape and admission of air thereto, mechanism for separating said anvil and mold, mechanism for pushing out the block from said mold, and a device for delivering the material to the mold, substantially as specified.

5. The combination, with a steam-hammer, of an anvil and a mold mounted thereon under said hammer, and provided with means for the escape and admission of air, mechanism for discharging the block from the mold, and a yielding support or table for receiving the block as it is discharged from the mold, substantially as specified.

6. The combination of a steam-hammer with an anvil, a series of revolving molds, means for the escape and admission of air to the molds, mechanism for intermittently-revolving said molds and centering them in turn in position under the hammer, mechanism for delivering the loose material to the molds and packing or partially compressing it therein before the mold is brought under the hammer, and mechanism for pushing out the block from the mold, substantially as specified.

7. The combination of the hammer, anvil, and revolving molds, of a hopper for delivering the material to the mold, a screw-blade and packer-disk adapted to fit said molds, mechanism for revolving the packer-shaft, and a friction-clamp on the packer-shaft for regulating the pressure of the packer on the material in the mold, substantially as specified.

8. The combination, with a steam-hammer of an anvil, and a mold resting thereon provided with narrow bearing-shoulder $b^2$ at its base, substantially as specified.

9. The combination, with a hammer, of an anvil, a series of molds mounted on a vertical shaft, and mechanism for raising the molds off the anvil and revolving the same, substantially as specified.

10. The combination, with a hammer, of an anvil, a series of revolving molds, mechanism for raising and revolving the molds, and a clutch for centering the mold with the hammer, substantially as specified.

11. The combination, with the hammer, anvil, and revolving molds, of a clutch for holding the molds in position under the hammer, and a lever for operating the clutch-bolt connected with the lever for operating the mechanism for raising and revolving the molds, whereby said clutch-bolt is withdrawn before said mold raising and revolving mechanism is set in operation, substantially as specified.

12. The combination, with the hammer, anvil, and revolving molds, of a clutch for holding the molds in position under the hammer, a lever for setting in operation the mechanism for raising and revolving the molds, and a cam on the molds for tripping said lever, whereby the molds are lowered and their revolution stopped the instant the clutch-bolt drops into the clutch, substantially as specified.

13. The combination, with the mold, of a device for pushing or knocking the block out of the mold, and a yielding device or support under the mold for receiving and supporting the block as it is discharged from the mold, substantially as specified.

14. The combination, with the mold, of a device for discharging the block therefrom, a yielding support for receiving the block as it is discharged, and a device for carrying the blocks away from the machine, substantially as specified.

15. The combination of the hammer, anvil, and series of revolving molds, of a plate or table beneath the molds, having openings therein for the anvil and for the discharge of the blocks from the mold, substantially as specified.

16. The combination, with the hammer, anvil, and revolving molds adapted to be raised off the anvil for the purpose of revolving the same, and a wedge to prevent said molds lifting up from the anvil during the operation of the hammer, substantially as specified.

17. The combination, with the hammer, anvil, and revolving molds, of a table or disk beneath the molds, supported on springs whereby it is pressed firmly against the bottom of the molds, and provided with an opening for the discharge of block from the molds, substantially as specified.

18. The combination, with an anvil, steam-hammer, and mold, of a pan surrounding the hammer above the mold and provided with an elastic band or packing, for the purpose of collecting leakage and preventing the water dropping into the mold, substantially as specified.

WILLIAM HARROLD SMITH.

Witnesses:
H. M. MUNDAY,
T. EVERETT BROWN.